Aug. 6, 1968  M. NADLER  3,395,977
ANHYDROUS MAGNESIUM CHLORIDE PRODUCTION
Filed Dec. 20, 1965
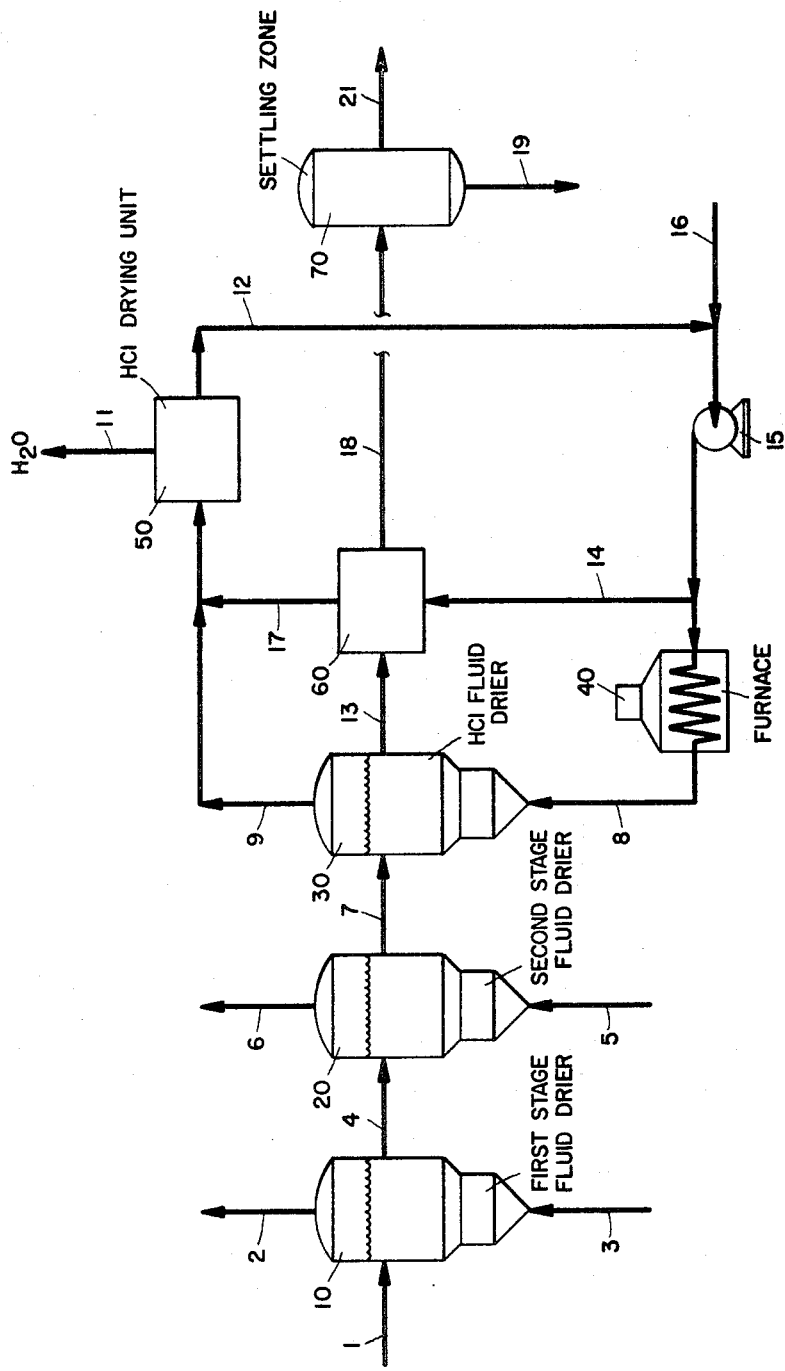
*MURRAY NADLER* INVENTOR
BY W. O. T. Heilman
PATENT ATTORNEY United States Patent Office 3,395,977
Patented Aug. 6, 1968

3,395,977
ANHYDROUS MAGNESIUM CHLORIDE
PRODUCTION
Murray Nadler, Morristown, N.J., assignor to Esso
Research and Engineering Company, a corporation of Delaware
Filed Dec. 20, 1965, Ser. No. 515,054
6 Claims. (Cl. 23—91)

ABSTRACT OF THE DISCLOSURE

Integrated process for the production of anhydrous magnesium chloride from hydrated magnesium chloride containing about 6 molecules of water of hydration. In the first stage the water of hydration is reduced to about 4, in the second stage the water of hydration is reduced to about 2 and in a third stage substantially anhydrous magnesium chloride is produced. In all three stages the magnesium chloride particles are maintained in fluidized condition; in the first and second stages by inert gases and in the third stage by hydrogen chloride gas. In the fourth stage the magnesium chloride is maintained in a molten condition and hydrogen chloride bubbled therethrough to remove the final traces of moisture and in a fifth stage final traces of magnesium hydroxychloride are removed by settling.

The present invention is broadly concerned with the dehydration and purification of magnesium chloride to produce a high quality anhydrous magnesium chloride product which may be further processed in an electrolytic cell such as a cell, known in the industry as an I.G. cell. Magnesium chloride feed for this type of cell must be of extremely high purity. The invention is particularly concerned with a particular arrangement of integrated stages whereby the magnesium chloride can be very effectively and economically dehydrated particularly using a plurality of fluidized treating zones in conjunction with other processing stages. In accordance with a particular adaptation of the present invention, hydrous magnesium chloride is fluidized in the initial two stages utilizing hot combustion gases as the fluidizing medium and then completely dehydrated in a tertiary stage utilizing hydrogen chloride gas as the fluidizing medium.

A severe complication in all processes for making anhydrous magnesium chloride is the tendency for magnesium chloride to hydrolyze via reactions of the type

$$MgCl_2 \cdot xH_2O \rightarrow MgOHCl + HCl\uparrow + (x-1)H_2O$$

The tendency of hydrolysis to occur increases sharply with decreasing water content of the hydrate, presumably because of the higher temperature at which the lower hydrate exists. Therefore, hydrolysis occurs to an increasing extent as drying of the hydrate proceeds. This reaction is extremely undesirable for several reasons. First, it increases the cost and complexity of purifying the magnesium chloride. This is because magnesium hydroxy chloride, the chief hydrolysis product at temperatures below 700° C., must be removed from the anhydrous magnesium chloride because it is an undesirable contaminant in the subsequent electrolysis. Secondly, hydrolysis results in a decrease in the amount of chlorine available for sale.

Thus, this invention is particularly concerned with an arrangement of integrated stages whereby magnesium chloride can be dehydrated with only a minor amount of hydrolysis and in an economically optimum sequence. This is accomplished by carrying out the latter stages of dehydration under a hydrogen chlorine atmosphere in which the partial pressures of water and hydrogen chloride are maintained at values at which hydrolysis is suppressed. Specifically, a plurality of fluidized treating zones in conjunction with other process stages are used.

It is known in the art that magnesium chloride, occurring naturally in brines and ore, can be separated from other salts and impurities yielding either as a pure magnesium chloride aqueous solution or a pure hydrate of magnesium chloride known as bischofite

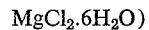

$MgCl_2 \cdot 6H_2O$)

Either the brine or the bischofite can be the starting material for the dehydration process covered by this invention.

It is also known in the art that by general dehydration processes it is possible to remove about four molecules of water without incurring excessive undesirable side reactions.

In accordance with a particular adaptation of the present invention, the magnesium chloride hydrate is dehydrated first to $MgCl_2 \cdot 4H_2O$ in a fluid bed drier and then to $MgCl_2 \cdot 2H_2O$ in a second fluid bed drier. The fluidizing gas in both beds is hot combustion gas which also serves as the heat source for dehydration. Some hydrolysis occurs in the beds equivalent to from about 2 to 4 wt. percent magnesium hydroxy chloride, reported as magnesium oxide.

The $MgCl_2 \cdot 2H_2O$ from the second fluid bed is almost completely dehydrated in a third fluid bed utilizing hot hydrogen chloride gas as the fluidizing and dehydration heating medium. The partial pressures of hydrogen chloride and water in the off-gas are maintained to meet certain criteria which suppress hydrolysis. Moreover, at these conditions most of the magnesium hydroxy chloride formed in the two previous beds is hydrochlorinated back to magnesium chloride. Anhydrous magnesium chloride leaving the third fluid bed still contains trace amounts of water which must be removed before electrolysis. The last traces of water are driven off in an electric fusion furnace when the anhydrous magnesium chloride is melted prior to hydrolysis. Hydrogen chloride gas is bubbled through the molten salt in the furnace to suppress hydrolysis. Again, the partial pressures of hydrogen chloride and water in the off-gas are controlled to meet certain criteria which suppress hydrolysis.

The final purification step is removal of any remaining hydrolysis products, now in the form of solid magnesium oxide, dispersed in the molten salt. The magnesium oxide, which is denser than magnesium chloride, is settled out of the molten salt in a settling ladle. The magnesium oxide is removed as a 25 wt. percent slurry in magnesium chloride. The magnesium oxide slurry is chlorinated in a chlorination tower by contact with chlorine gas in the presence of carbon to convert the magnesium oxide to magnesium chloride, and this magnesium chloride is then recycled back to the settling ladle. Clear, high purity molten magnesium chloride is decanted from the top of the settling ladle to the electrolysis cells. Wet hydrogen chloride off-gas from both the third stage fluid bed and the electric furnace is dried and preheated in a furnace and recycled to the third stage fluid drier. A small amount of make-up hydrogen chloride is required to replace hydrogen chloride losses and hydrogen chloride used to hydrochlorinate magnesium hydroxy chloride in the third stage fluid bed.

The process of the present invention may be more fully understood by referring to the drawing illustrating one embodiment of same. Referring specifically to the drawing, magnesium chloride hydrate is introduced into the initial zone 10 by means of line 1. The feed to initial zone 10 may be either an aqueous solution of magnesium chloride or bischofite or any of the lower hydrates, each of which can be derived from naturally occurring brines or ores by conventional processes.

Initial zone 10 is a conventional fluidization zone operated at atmospheric pressure and at a temperature in the range of about 114° C. to 120° C., preferably at about 117° C. Hot combustion exhaust gases formed, for example, by burning natural gas in air, is introduced into the bottom of zone 10 by means of line 3 to fluidize the magnesium chloride hydrates. Heat for dehydration is provided by the sensible heat given up by the combustion gases in falling from inlet temperature to fluid bed temperature. At the temperature in zone 10 and with residence time of about an hour, the magnesium chloride hydrate is dehydrated to $MgCl_2 \cdot 4H_2O$. Wet off-gas from zone 10 is removed from the top of zone 10 by means of line 2. The $MgCl_2 \cdot 4H_2O$ is removed by conventional means continuously from zone 10 by means of line 4.

The $MgCl_2 \cdot 4H_2O$ withdrawn from zone 10 by means of line 4 is introduced into a secondary fluidization zone 20 which, like zone 10, is a fluid bed fluidized and heated by hot combustion gas introduced at the bottom by means of line 5. The secondary fluidization zone is maintained at about atmospheric pressure and at a temperature in the range of from 175° C. to 185° C. as, for example, 180° C. At this temperature and maintaining a sufficiently long solids mean residence time in the bed of about an hour, the $MgCl_2 \cdot 4H_2O$ is dehydrated to $MgCl_2 \cdot 2H_2O$. Wet off-gas is withdrawn from zone 20 by means of line 6. The $MgCl_2 \cdot 2H_2O$ is withdrawn by conventional means from zone 20 by means of line 7. The $MgCl_2 \cdot 2H_2O$ at this point contains about 2 to 4 wt. percent, for example, about 3 wt. percent magnesium hydroxy chloride reported as magnesium oxide which is formed in zones 10 and 20 by hydrolysis of magnesium chloride.

Magnesium chloride from zone 20 is introduced into tertiary fluidization zone 30 by means of line 7. This is a fluid bed drying zone operating in the same manner as zones 10 and 20 except that the fluidizing heating medium is hot anhydrous hydrogen chloride gas introduced into the bottom of zone 30 with line 8. As previously mentioned, hydrogen chloride gas is used as the fluidization drying medium to suppress hydrolysis of the magnesium chloride and to hydrochlorinate magnesium hydroxy chloride formed in previous zones 10 and 20 back to magnesium chloride. Temperature and pressure and residence time in zone 30 are maintained to produce essentially anhydrous magnesium chloride.

As previously mentioned, use of hydrogen chloride as the fluidization drying medium in zone 30 sharply depresses hydrolysis of magnesium chloride. However, to achieve the maximum hydrolysis suppression effect, certain criteria for the partial pressures for water and hydrogen chloride in the zone 30 off-gas must be met. The reasons for this may be understood from the fact that the following reactions can occur:

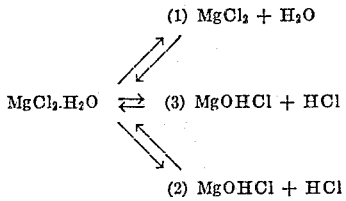

(1) $MgCl_2 + H_2O$
$MgCl_2 \cdot H_2O \rightleftarrows$ (3) $MgOHCl + HCl$
(2) $MgOHCl + HCl$ As can be verified from the laws of thermodynamics, hydrolysis of magnesium chloride by reaction 3 can be prevented by maintaining a ratio of partial pressure of hydrogen chloride to water in zone 30 higher than a critical ratio, $K_1$. Again, hydrolysis by reaction 2 can be prevented by maintaining the hydrogen chloride partial pressure in zone 30 off-gas above a critical pressure, $K_2$. In order to form anhydrous magnesium chloride in zone 30 via reaction 1, the partial pressure of water in zone 30 off-gas must be maintained below yet another critical pressure, $K_3$. It is to be noted that by exceeding ratio $K_1$ in zone 30, any magnesium hydroxy chloride formed in zones 10 and 20 may be hydrochlorinated back to magnesium chloride.

The three critical values are functions of temperature only. These values are tabulated as functions of temperature in the following Table 1.

TABLE 1.—CRITERIA FOR HCl FLUID BED

| T., °C. | $K_1$ | $K_2$ | $K_3$ | $K_4$ |
|---|---|---|---|---|
| 25 | 11.75 | $7.71 \times 10^{-7}$ | $5.64 \times 10^{-8}$ | |
| 77 | 7.02 | $6.44 \times 10^{-5}$ | $8.13 \times 10^{-5}$ | |
| 127 | 4.82 | $1.54 \times 10^{-3}$ | $2.80 \times 10^{-4}$ | 0.001 |
| 177 | 3.59 | $1.75 \times 10^{-2}$ | $4.36 \times 10^{-3}$ | |
| 227 | 2.86 | $1.20 \times 10^{-1}$ | $3.84 \times 10^{-2}$ | 0.0142 |
| 277 | 2.38 | $5.73 \times 10^{-1}$ | $2.23 \times 10^{-1}$ | |
| 327 | 2.03 | 2.08 | $9.42 \times 10^{-1}$ | 0.0955 |
| 377 | 1.80 | 4.0 | 3.2 | |
| 427 | 1.63 | 9.0 | 10.0 | 0.405 |
| 527 | | | | 1.44 |
| 627 | | | | 4.70 |
| 714 | | | | 11.2 |

The temperature maintained in the tertiary fluidization zone 30 is in the range of from 320° C. to about 335° C. as, for example, 327° C. In this temperature range, anhydrous magnesium chloride is formed via reaction 1 at a water partial pressure in the off-gas which is sufficiently high so as not to require an impractically large amount of hydrogen chloride recycle rate to maintain the required ratio of partial pressure of hydrogen chloride and water.

The criteria for drying for the off-gas from zone 30 to suppress hydrolysis of magnesium chloride at 327° C., referring to Table 1, are $K_1 = P_{HCl}$ --------------------------------- >2.0
$K_2 = P_{HCl}/P_{H_2O}$ --------------------- >2.1
$K_3 = P_{H_2O}$ --------------------------------- <0.94

A suitable set of partial pressures which meet these criteria are $P_{HCl} = 2.2$ atm.
$P_{H_2O} = 0.3$ atm.
Total pressure = 2.5 atm.

A mean residence time of solids in zone 30 of about one hour is sufficient to achieve the desired dehydration.

Anhydrous magnesium chloride from zone 30 is passed by means of line 13 into an electrically heated furnace zone 60 where the salt is melted prior to feeding to the electrolytic cells. However, the anhydrous magnesium chloride from zone 30 contains trace amounts of water and small amounts of magnesium hydroxy chloride. The trace moisture is driven off from the molten magnesium chloride in zone 60.

The furnace zone 60 is operated at substantially atmospheric pressure and at temperatures in the range of from 714° C. to 820° C., preferably at 714° C. (the normal melting point of magnesium chloride). Anhydrous hydrogen chloride gas from the HCl drying unit is introduced into the bottom of the furnace zone 60 by means of line 14 and blower 15 and dispersed in zone 60 with an agitator in order to suppress hydrolysis of magnesium chloride in zone 60. Wet hydrogen chloride off-gas from zone 60 is passed from the top of zone 60 by means of line 17 and sent to the hydrogen chloride drying unit 50.

The molten magnesium chloride is withdrawn from furnace zone 60 by means of line 18 and introduced into a settling zone or settling ladle zone 70. Here, final traces of magnesium oxide which may be in the molten salt are settled out and removed as a slurry in magnesium chloride by means of line 19. This slurry may be recovered by passing it to a chlorination tower where the magnesium oxide is recovered by chlorinating to magnesium chloride with chlorine in the presence of carbon. The chlorinated salt is returned to the settling zone 70.

High quality magnesium chloride, free of impurities, is withdrawn from settling zone 70 by means of line 21 and sent to the electrolysis area for further processing.

It is to be noted because of kinetic and diffusion effects, maintaining or surpassing the critical criteria in zone 30 alone will not completely suppress hydrolysis. By the same token, maintaining even a partial HCl atmosphere, even though the criteria are not completely fulfilled, will partially suppress hydrolysis compared with drying with an inert atmosphere. To some degree the effectiveness in suppressing hydrolysis can be increased by increasing HCl contents above the critical criteria but the additional suppression does not economically justify the added cost of recirculating the additional HCl. These effects are vividly illustrated in the following Table 2.

$P_{HCl}=0.918$ atm.
$P_{H_2O}=0.082$ atm.
Total pressure=1.000 atm.

Thus, the present process is concerned with an integrated staged operation wherein in the initial stage or stages, the fluidizing gas comprises hot combustion gases and in the final stages the fluidizing gas comprises hydrogen chloride. By the present technique a high quality magnesium chloride product is secured.

What is claimed is:

1. Integrated process for the removal of water of hydration from magnesium chloride containing about 6 molecules of water of hydration which comprises fluidizing particles of magnesium chloride in a first stage with an inert gas wherein said first stage is maintained at a temperature in the range of about 114° C. to about 120° C., thereafter introducing partially dehydrated magnesium chloride particles containing about 4 molecules of water of hydration into a second stage and fluidizing said particles with an inert gas under conditions wherein said second stage is maintained at a temperature in the range from about 175° C. to about 185° C., thereafter introducing said magnesium chloride particles containing about 2 molecules of water of hydration into a third stage wherein said particles are maintained in a fluidized condition utilizing hot hydrogen chloride gas as the fluidizing gas, maintaining said third stage at a temperature in the range of about 320° C. to about 335° C. and also maintaining the partial pressure of hydrogen chloride and water in said third stage to suppress hydrolysis, withdrawing from said third stage substantially anhydrous magnesium chloride particles containing traces of water and small amounts of magnesium hydroxy chloride, introducing said substantially anhydrous magnesium chloride particles into a fourth stage maintained at a temperature in the range from about 714° C. to about 820° C. wherein the substantially anhydrous magnesium chloride is in the molten state, passing hydrogen chloride gas through the molten magnesium chloride thereby removing the last traces of water therefrom, withdrawing the molten magnesium chloride from said fourth stage and introducing the same into a fifth stage wherein magnesium hydroxy chloride particles are settled and separated from the molten anhydrous magnesium chloride.

2. Process as defined by claim 1 wherein the first stage is maintained at a temperature of about 117° C., wherein said second stage is maintained at about 180° C., wherein said third stage is maintained at about 327° C. and wherein said fourth stage is maintained at about 714° C.

3. Process as defined by claim 1 wherein the temperatures in said first, second, and third stages are maintained by the temperatures of the incoming fluidizing gases.

4. Process as defined by claim 1 wherein said inert gases comprise combustion gases.

5. Process as defined by claim 1 wherein a wet hydrogen chloride gas is withdrawn overhead from said third stage and passed into a drying zone for the removal of TABLE 2.—COMPARISON OF DEHYDRATION OF MgCl₂-yH₂O WITH AIR AND HCl

| | y (Feed) | Fluidizing Gas | Press., p.s.i.a. | Bed T., °F. | Res. Time, Min. | y (Product) | MgO Wt. percent |
|---|---|---|---|---|---|---|---|
| Operation No.: | | | | | | | |
| 1 | 6.0 | Air | 15 | 272 | 17 | 2.5 | 2.0 |
| 2 | 6.0 | Air | 15 | 262 | 30 | 2.0 | 1.0 |
| 3 | 3.5 | Air | 15 | 300 | 25 | 1.0 | 4.8 |
| 4 | 6.0 | HCl | 15 | 530 | 28 | 1.7 | <0.1 |
| 5 | 4.3 | HCl | 15 | 530 | 24 | 0.9 | 0.5 |
| 6 | 2.2 | HCl | 27 | 530 | 60 | 0.03 | 0.70 |
| 7 | 2.2 | HCl | 32 | 620 | 60 | 0.88 | <0.10 |
| 8 | 2.2 | HCl | 32 | 620 | 30 | 0.62 | 0.43 |

The foregoing data were obtained by dehydration of magnesium chloride hydrates in a fluid bed similar to those described in the previous process description. The operations are aimed at comparing dehydration of magnesium chloride hydrates with air and with hydrogen chloride. The data verify that hydrolysis of magnesium chloride is sharply suppressed by using hydrogen chloride as the fluidizing medium as compared with an inert medium, air, and at this suppression effect is more complete as the critical criteria previously discussed are approached.

In an operation analogous to zone 30, HCl gas is bubbled through the molten magnesium chloride in the electric furnace zone 60 to suppress hydrolysis of magnesium chloride. Again, hydrogen chloride and water partial pressures in the off-gas must meet certain criteria to effectively achieve suppression of hydrolysis. This results since hydrolysis of magnesium chloride in the electric furnace occurs via the following reaction (4)
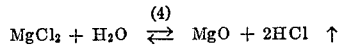

From thermodynamic considerations, hydrolysis in the furnace can be prevented by maintaining a ratio of partial pressure of hydrogen chloride to water in the off-gas from zone 60 higher than a critical constant, $K_4$. In this case, $K_4$ is defined as the ratio of partial pressures of hydrogen chloride to water when the sum of the partial pressures of hydrogen chloride and water are equal to 1 atmosphere. $K_4$ is a function of temperature only and is tabulated in Table 1 against temperature.

Referring to Table 1 operating zone 40 at 714° C., the following partial pressures must be maintained to exceed the critical ratio of partial pressures in zone 40.

the water to secure anhydrous hydrogen chloride, separating said anhydrous hydrogen chloride from said drying zone, heating the same and recycling said hydrogen chloride to said third stage.

6. Process as defined by claim 1 wherein said magnesium hydrogen chloride particles are recycled to the system.

References Cited

UNITED STATES PATENTS

| 1,232,169 | 7/1917 | Ashcroft | 23—91 |
| 1,359,652 | 11/1920 | Ashcroft | 23—91 |
| 1,835,818 | 12/1931 | Smith et al. | 23—91 |
| 1,852,227 | 4/1932 | Barstow et al. | 23—91 |
| 1,880,505 | 10/1932 | Smith | 23—91 |
| 1,896,406 | 2/1933 | Heath | 23—91 |
| 1,903,592 | 4/1933 | Lacell | 23—91 |
| 2,355,367 | 8/1944 | Cooper | 23—91 |
| 3,067,006 | 12/1962 | Ebert | 23—91 |

OTHER REFERENCES

Journ. Indian Chem. Soc., Ind. & News Ed., vol. 14, Nos. 3 and 4, 1951, pp. 171–174.

OSCAR R. VERTIZ, *Primary Examiner.*

E. STERN, *Assistant Examiner.*